United States Patent
McClung et al.

(10) Patent No.: US 10,853,844 B2
(45) Date of Patent: Dec. 1, 2020

(54) COMBINING IMAGE RECOGNITION WITH DATA ANALYTICS TO GENERATE SHOPPING SUGGESTIONS FOR A DRIVER

(71) Applicant: TOYOTA MOTOR NORTH AMERICA, INC., Plano, TX (US)

(72) Inventors: Mark Anthony McClung, Plano, TX (US); Wilson-Boon Siang Khoo, Plano, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 49 days.

(21) Appl. No.: 16/201,320

(22) Filed: Nov. 27, 2018

(65) Prior Publication Data

US 2020/0167824 A1   May 28, 2020

(51) Int. Cl.
*G06Q 30/02*   (2012.01)
(52) U.S. Cl.
CPC ..... *G06Q 30/0266* (2013.01); *G06Q 30/0255* (2013.01); *G06Q 30/0259* (2013.01); *G06Q 30/0269* (2013.01)

(58) Field of Classification Search
CPC .................................................. G06Q 30/02
See application file for complete search history.

(56) References Cited

U.S. PATENT DOCUMENTS

| | | | |
|---|---|---|---|
| 6,317,718 B1 | 11/2001 | Fano | |
| 7,386,477 B2 | 6/2008 | Fano | |
| 8,073,460 B1 | 12/2011 | Scofield | |
| 2005/0216186 A1* | 9/2005 | Dorfman | G06Q 30/018 701/408 |
| 2006/0195858 A1* | 8/2006 | Takahashi | G01C 21/3647 725/19 |
| 2007/0083297 A1* | 4/2007 | Tengler | H04L 67/12 701/1 |
| 2012/0323690 A1* | 12/2012 | Michael | G06Q 30/02 705/14.58 |
| 2013/0151240 A1* | 6/2013 | Myslinski | G06Q 10/10 704/9 |
| 2014/0108307 A1 | 4/2014 | Raghunathan | |

* cited by examiner

*Primary Examiner* — Vincent M Cao
(74) *Attorney, Agent, or Firm* — Sheppard, Mullin, Richter & Hampton LLP; Hector A. Agdeppa; Daniel N. Yannuzzi (57) ABSTRACT

Systems and methods to generate purchase suggestions are disclosed. Exemplary implementations may: present purchase suggestions, by a user interface to the vehicle occupant; generate output signals conveying a location of the vehicle; receive and determine output signals of external resources conveying interest information of the vehicle occupant; determine, based on the output signals, location of the vehicle; determine, based on the location and vehicle-to-infrastructure communications, business information of one or more businesses nearby; build one or more business profiles; build one or more purchase profiles; store the one or more business profiles and/or purchase profiles in electronic storage; determine, based on the one or more business profiles, the driver's purchase profile, and/or the location information, purchase suggestions for the driver; and present, through the user interface, the purchase suggestions for the driver.

18 Claims, 5 Drawing Sheets

COMBINING IMAGE RECOGNITION WITH DATA ANALYTICS TO GENERATE SHOPPING SUGGESTIONS FOR A DRIVER

BACKGROUND

Often times, consumers spend a lot of time searching for the best nearby place to purchase a product of interest. When searching, consumers may come across business hours, inventory, promotions, and other information of a business where the information may be out-of-date. Additionally, consumers may forget that they are in need of a product when in an area where he/she has the opportunity to purchase it.

BRIEF SUMMARY OF EMBODIMENTS

One aspect of the present disclosure relates to a system configured to generate purchase suggestions to a vehicle occupant based on the vehicle's current location and up-to-date information about a business. The system may include one or more hardware processors configured by machine-readable instructions. The system may be configured to provide, by a user interface, an interface between a vehicle occupant and a vehicle system to present purchase suggestions to the vehicle occupant. Sensor(s) may be configured to generate output signals conveying location information of the vehicle. The processor(s) may be configured to determine, based on output signals of external resources' data analytics, interest information of the vehicle occupant. Interest information may be indicative of products the vehicle occupant may potentially purchase. The processor(s) may be configured to determine, based on the output signals, the location information of the vehicle. The processor(s) may be configured to determine, based on the location information and/or vehicle-to-infrastructure (V2I) communications, business information of one or more businesses nearby. Business information may include what a business would like customers to know. The processor(s) may be configured to build, and store to electronic storage, one or more business profiles and/or one or more purchase profiles. The one or more business profiles may include the business information. the one or more purchase profiles may include the interest information of the vehicle occupant. Based on the one or more business profiles, the vehicle occupant's purchase profile, and/or the location information, the processor(s) may be configured to determine and present purchase suggestions to the vehicle occupant through the user interface. Sensor(s) may be configured to generate output signals conveying image information indicative of information displayed on businesses' storefronts. Based on the image information, processor(s) may determine and present the storefront information to the vehicle occupant via the user interface. The storefront information may also be added or updated, and/or stored to a business profile in electronic storage.

As used herein, the term "determine" (and derivatives thereof) may include measure, calculate, compute, estimate, approximate, generate, and/or otherwise derive, and/or any combination thereof.

Another aspect of the present disclosure relates to a method to generate purchase suggestions to a vehicle occupant based on the vehicle's current location and up-to-date information about a business. The method may include providing, by a user interface, an interface between a vehicle occupant and a vehicle system to present purchase suggestions to the vehicle occupant. The method may include generating output signals conveying location information of the vehicle. The method may include determining, based on output signals of external resources' data analytics, interest information of the vehicle occupant. Interest information may be indicative of what the vehicle occupant may potentially purchase. The method may include determining, based on the output signals, the location information. The method may include determining, based on the location information and/or V2I communications, business information of one or more businesses nearby. Business information may include what a business would like customers to know. The method may include building, and store to electronic storage, one or more business profiles to include the business information and/or purchase profiles. The one or more business profiles may include the business information. The one or more purchase profiles may include the interest information of the vehicle occupant. The method may include determining and presenting, based on the one or more business profiles, the vehicle occupant's purchase profile, and/or the location information, purchase suggestions to the vehicle occupant. The method may also include generating and determining output signals conveying image information indicative of information displayed on businesses' storefronts. The method may also include adding or updating, and/or storing the storefront information to a business profile in electronic storage.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION OF THE EMBODIMENTS

Implementations of the disclosure are directed to generating purchase suggestions to occupants of a vehicle while the vehicle is in proximity of businesses that may fulfill the occupants product needs and desires. The system may determine product/services needed or desired from an analysis of search histories, past purchases, and the like related to the occupants. Based on the analysis, the system may predict and suggest a product or service the occupant may be interested in purchasing, via a user interface.

Implementations of the disclosure are further directed to presenting useful information displayed on a storefront of a business to the vehicle occupant. The system may capture image information and translate it to recognizable characters. The recognizable characters may be displayed via the user interface for the vehicle occupant to utilize. All captured information, including information about vehicle occupants and businesses may be stored to a respective vehicle occupant profile or business profile in electronic storage.

Figure 1:
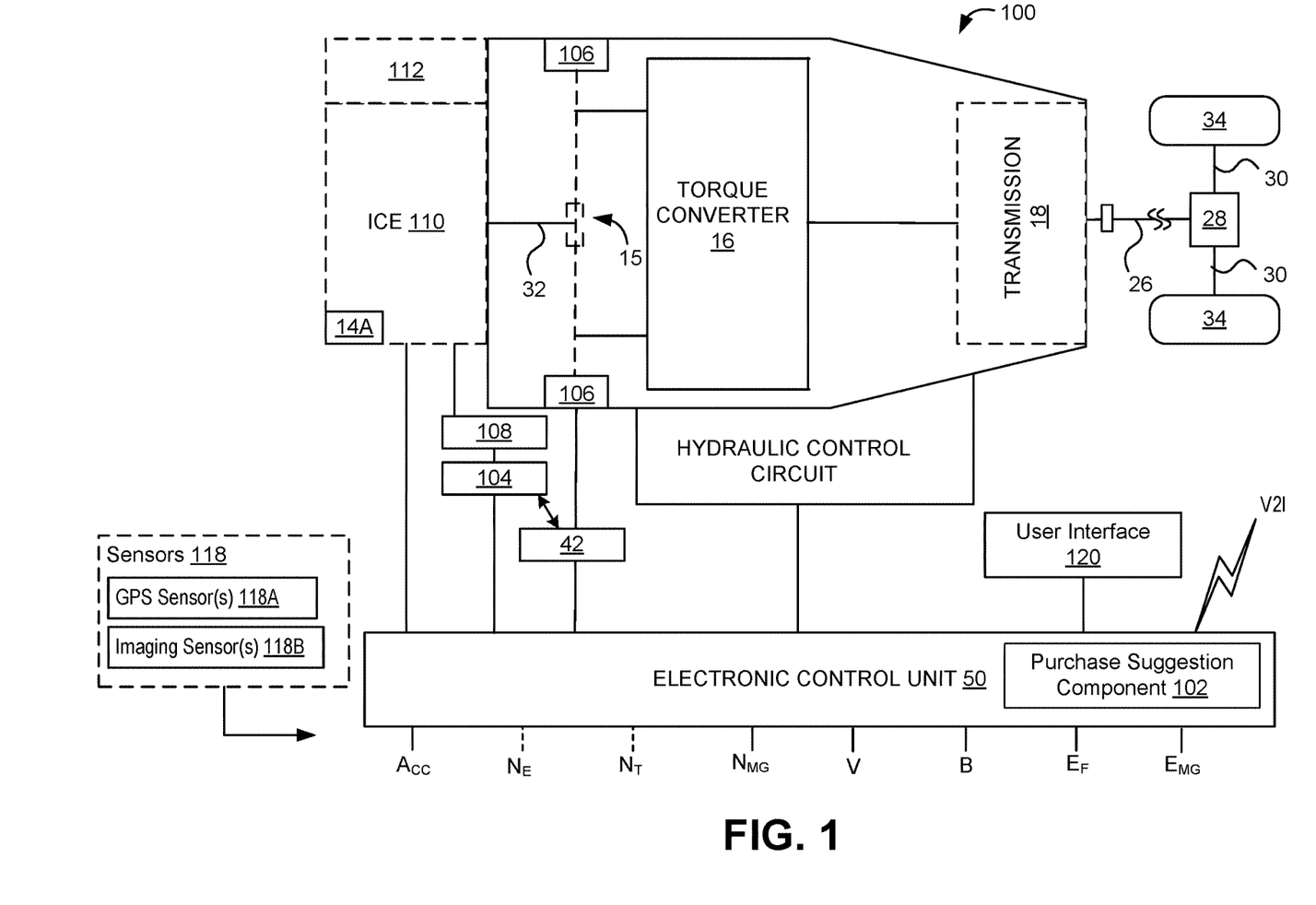
FIG. 1 illustrates an example vehicle in which embodiments of the disclosed technology may be implemented.

FIG. 1 illustrates an example vehicle 100 in which embodiments of the disclosed technology may be implemented to provide purchase suggestions to an occupant of the vehicle (e.g., driver or passenger). It should be appreciated that implementations described herein are not limited to the vehicle type illustrated by FIG. 1, and that implementations described herein may be implemented in any vehicle having the necessary components to generate purchase suggestions in accordance with implementations described herein.

Vehicle 100 may include an internal combustion engine 110 and one or more electric motors 106 (which may also serve as generators) as sources of motive power. Driving force generated by the internal combustion engine 110 and motor 106 can be transmitted to one or more wheels 34 via a torque converter 16, a transmission 18, a differential gear device 28, and a pair of axles 30.

Vehicle 100 may be driven/powered with either or both of engine 110 and the motor(s) 106 as the drive source for travel. For example, a first travel mode may be an engine-only travel mode that only uses internal combustion engine 110 as the drive source for travel. A second travel mode may be an EV travel mode that only uses the motor(s) 106 as the drive source for travel. A third travel mode may be an HEV travel mode that uses engine 110 and the motor(s) 106 as drive sources for travel.

Engine 110 can be an internal combustion engine such as a spark ignition (SI) engine (e.g., gasoline engine) a compression ignition (CI) engine (e.g., diesel engine) or similarly powered engine (whether reciprocating, rotary, continuous combustion or otherwise) in which fuel is injected into and combusted to provide motive power. A cooling system 112 can be provided to cool the engine such as, for example, by removing excess heat from engine 110. For example, cooling system 112 can be implemented to include a radiator, a water pump and a series of cooling channels.

An output control circuit 14A may be provided to control drive (output torque) of engine 110. Output control circuit 14A may include a throttle actuator to control an electronic throttle valve that controls fuel injection, an ignition device that controls ignition timing, and the like. Output control circuit 14A may execute output control of engine 110 according to a command control signal(s) supplied from an electronic control unit 50, described below. Such output control can include, for example, throttle control, fuel injection control, and ignition timing control.

Motor 106 can also be used to provide motive power in vehicle 100, and is powered electrically via a battery 104. Battery 104 may be implemented as one or more batteries or other power storage devices including, for example, lead-acid batteries, lithium ion batteries, capacitive storage devices, and so on. Battery 104 may be charged by a battery charger 108 that receives energy from internal combustion engine 110. For example, an alternator or generator may be coupled directly or indirectly to a drive shaft of internal combustion engine 110 to generate an electrical current as a result of the operation of internal combustion engine 110. A clutch can be included to engage/disengage the battery charger 108. Battery 104 may also be charged by motor 106 such as, for example, by regenerative braking or by coasting during which time motor 106 operate as generator.

Motor 106 can be powered by battery 104 to generate a motive force to move the vehicle and adjust vehicle speed. Motor 106 can also function as a generator to generate electrical power such as, for example, when coasting or braking. Battery 104 may also be used to power other electrical or electronic systems in the vehicle. Motor 106 may be connected to battery 104 via an inverter 42. Battery 104 can include, for example, one or more batteries, capacitive storage units, or other storage reservoirs suitable for storing electrical energy that can be used to power motor 106. When battery 104 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 106, and adjust the current received from motor 106 during regenerative coasting and breaking. As a more particular example, output torque of the motor 106 can be increased or decreased by electronic control unit 50 through the inverter 42.

A torque converter 16 can be included to control the application of power from engine 110 and motor 106 to transmission 18. In other embodiments, a mechanical clutch can be used in place of torque converter 16.

Clutch 15 can be included to engage and disengage engine 110 from the drivetrain of the vehicle. In the illustrated example, a crankshaft 32, which is an output member of engine 110, may be selectively coupled to the motor 106 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch.

Vehicle 100 may include sensor(s) 118, electronic control unit 50, user interface 120, and/or other components.

Electronic control unit 50 may include circuitry to control various aspects of the vehicle's operation. Electronic control unit 50 may include, for example, a microcomputer that includes one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control component, a powertrain control component, a transmission control component, a suspension control component, a body control component, and so on. These various control units can be implemented using two or more separate electronic control units, or using a single electronic control unit.

Figure 2:
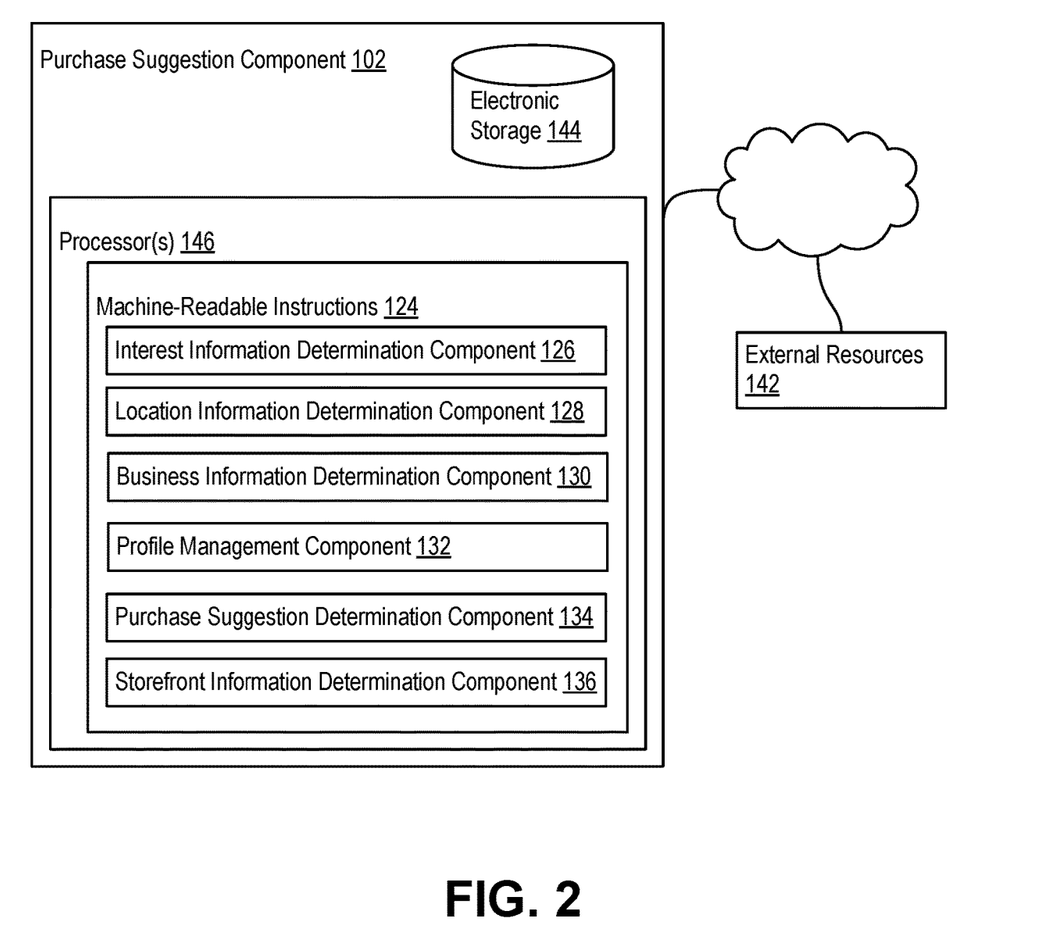
FIG. 2 illustrates a system configured to generate purchase suggestions, in accordance with one or more implementations.

Electronic control unit 50 also includes a purchase suggestion component 102, illustrated in further detail by FIG. 2. As further described below, purchase suggestion component 102 is configured to use information provided by a plurality of sensors, in addition to other collected information, to provide purchase suggestions to an occupant of the vehicle.

In the example illustrated in FIG. 1, electronic control unit 50 receives information from a plurality of sensors 118 included in vehicle 100. Individual sensors may be configured to capture information, including but not limited to visual information, video information, audio information, geolocation information, orientation and/or motion information, depth information, and/or other information. In some embodiments, one or more of the sensors 118 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 118 may provide an analog output or a digital output.

Sensors 118 may include GPS sensor(s) 118A that may be configured to generate output signals conveying location information of the vehicle such as latitude, longitude, and/or altitude. The location information may include the GPS coordinates and/or other indications of the vehicle's current location.

Sensors 118 may also include imaging sensor(s) 118B (e.g., image sensors of cameras mounted on the exterior of the vehicle) that may be configured to generate output signals conveying image information captured by the vehicle as it drives by one or more businesses. The image information may include captured images and/or video of storefronts outside the vehicle. As used herein, the terms "camera" and/or "imaging sensor" may include any device that captures images, including but not limited to a single lens-based camera, a camera array, a solid-state camera, a mechanical camera, a digital camera, a depth sensor, a remote sensor, a lidar, an infrared sensor, a (monochrome) complementary metal-oxide-semiconductor (CMOS) sensor, an active pixel sensor, and/or other sensors.

Information captured by each sensor may be marked, timestamped, annotated, and/or otherwise processed such that information captured by other sensors can be synchronized, aligned, annotated, and/or otherwise associated therewith. For example, image information captured by an image sensor may be synchronized with information captured by an accelerometer or other sensor. Output signals generated by individual image sensors (and/or information based thereon) may be stored and/or transferred in electronic files.

V2I communications may also occur between electronic control unit 50 and infrastructures to obtain business information for businesses within proximity to the vehicle.

User interface 120 may be configured to, visual and/or audibly, provide an interface between a vehicle occupant and the vehicle system to present purchase suggestions to the vehicle occupant. Additionally, user interface 120 may be configured to present determined storefront information of nearby businesses to the occupant. Purchase suggestions may be displayed, for example, on an in-car entertainment or in-vehicle infotainment display system. In the case of audio presentation, the vehicle's speaker system, for example, may be used to present the purchase suggestions.

FIG. 2 is a block diagram illustrating example components of a purchase suggestion component 102, in accordance with one or more implementations. Purchase suggestion component 102 may be configured by machine-readable instructions 124. Machine-readable instructions 124 may include one or more instruction components. The instruction components may include computer program components. The instruction components may include one or more of an interest information determination component 126, a location information determination component 128, a business information determination component 130, a profile management component 132, a purchase suggestion determination component 134, a storefront information determination component 136, and/or other instruction components.

Interest information determination component 126 may be configured to determine, based on output signals from external resources 142, interest information of an occupant of the vehicle (e.g., the driver). External resources 142 may include, for example, some service that provides access to an account associated with the vehicle occupant. For example, the service may provide access to a social media account, a shopping account, a search engine account, a banking account, etc. Interest information determination component 126 may communicate with external resources 142 using a network interface of the vehicle (e.g., cellular, WIFI, satellite, etc.) or through a network interface of a secondary device (e.g., smartphone) that communicates with the vehicle. In some implementations, the occupant of the vehicle (e.g., driver) may enter credentials for each account from which interest information is accessed.

Interest information may provide an identification of a product, service, product type, or service type a vehicle occupant is interested in purchasing. It may include a vehicle occupant's (e.g., driver's) purchase preferences, purchase history of products or services, or desired products or services. Interest information communicated from external resources 142 may include data analytics of a plurality of online shopping wish lists, browser search history (e.g., based on search engine account data), past purchases (e.g., based on credit card account data or shopping account data), shopping lists (e.g., based on shopping account data), and other information indicating what a user has purchased or may purchase in the future. Interest information of a vehicle occupant may be added or updated, and stored to a corresponding purchase profile in electronic storage 144.

By way of example, interest information determination component 126 may determine that the driver may be interested in purchasing protein powder. This determination may be based on the driver's search history, as collected from a search engine account of the driver, of researching the best brand and putting the item in their online shopping cart, but never purchasing the item. This interest information may be used in conjunction with the driver's location information and V2I communications to determine a nearby business that sells protein powder that may be of interest to the driver.

Location information determination component 128 may be configured to determine, based on the output signals of GPS sensor(s) 118A, location information (e.g., latitude and longitude) a vehicle. Continuing the above mentioned example embodiment, the vehicle's location information may indicate that it is near a supplement store.

Business information determination component 130 may be configured to determine, based on the location information and/or V2I communications, business information of one or more nearby businesses. By use of the vehicle's location information, the vehicle may be able to communicate, via V2I communications, with nearby businesses. Businesses may include grocery stores, clothing stores, pharmacies, fueling stations, and other establishments where a product is sold. By way of non-limiting example, business information may include inventory data, advertisements, active promotions, current prices of products or service, and other product or service information that a business communicates to current or potential customers. Communication of the business information from the businesses to the vehicle via V2I communications may require participation of businesses in the proposed system in which the businesses decide what business information they would like share with nearby vehicles.

Profile management component 132 may be configured to build one or more business profiles and/or one or more purchase profiles. Building the one or more business profiles may include creating, adding, and/or updating the business information of a corresponding business. Building the one or more purchase profiles may include creating, adding, and/or updating the interest information of a corresponding vehicle occupant (i.e., present or future driver/passenger). Profile management component 132 may also be configured to store the one or more business profiles, and/or the one or more purchase profiles in electronic storage 144.

Purchase suggestion determination component 134 may be configured to determine, based on the one or more business profiles, the vehicle occupant's purchase profile, and the location information, purchase suggestions for the vehicle occupant. Determination may include one of or a combination of data analysis, algorithms, and/or other determinations calculations. Purchase suggestion determination component 134 may also be configured to communicate the purchase suggestions for the vehicle occupant to user interface 120. By way of non-limiting example, purchase suggestions may include advertisements, reminders to purchase, and/or current inventory nearby of a product.

Continuing the above mentioned example, the determined business information stored to the business profiles may include a nearby supplement store that carries the brand the driver almost bought online. The supplement store's business profile may also indicate that the protein powder could be purchased today only for 20% off. A purchase suggestion may be determined and presented, based on the business profile of the nearby supplement store and the driver's purchase profile, on the user interface. The purchase suggestion may convey that the nearby supplement store carries his/her desired brand of protein powder and may be purchased today for 20% off.

In another example, consider a driver that is near a pharmacy. Interest information component 126 may have determined, based on past prescription orders, that a prescription is due for a refill. This determination may have been stored as interest information that is part of the driver's profile. Additionally, through analysis of existing business profiles, it may be determined that the pharmacy carries the driver's usual prescription brand. Purchase suggestion determination component 134, based on the driver's proximity to the pharmacy, the pharmacy's business profile, and the prescription history from the purchase profile, may determine a suggestion to order a refill. The suggestion to order a refill may be subsequently communicated to user interface 120 for presentation to the driver.

Storefront information determination component 136 may be configured to determine storefront information. Storefront information includes information that is visually displayed by each business. By way of non-limiting example, storefront information may include a business name, business hours, promotions, and/or acceptable payment forms. Storefront information determination component 136 may receive image information from imaging sensor(s) 118B including captured images and/or videos of storefronts outside the vehicle. The image information may subsequently be communicated to an optical character recognition source, or similar, of external resources 142 to determine the storefront information about one or more businesses. In an example embodiment, storefront information for a clothing business may include they are open 9 AM-7 PM, closed on Mondays, and accept all credit card forms, cash, but not contactless payment. In another example embodiment, storefront information for a gas station may include the prices for each type of fuel and an existing discount on fuel if you purchase a car wash.

Additionally, profile management component 132 may be configured to add and/or update the storefront information of the one or more businesses' business profiles.

In some implementations, purchase suggestion component 102 and external resources 142 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which purchase suggestion component 102 and external resources 142 may be operatively linked via some other communication media.

External resources 142 may include sources of information outside of purchase suggestion component 102, external entities participating with purchase suggestion component 102, and/or other resources. In some implementations, some or all of the functionality attributed herein to external resources 142 may be provided by resources included in purchase suggestion component 102.

Purchase suggestion component 102 may include electronic storage 144, one or more processors 146, and/or other components. Purchase suggestion component 102 may include communication lines, or ports to enable the exchange of information with a network and/or other computing platforms. Illustration of purchase suggestion component 102 in FIG. 2 is not intended to be limiting. Purchase suggestion component 102 may include a plurality of hardware, software, and/or firmware components operating together to provide the functionality attributed herein to purchase suggestion component 102. For example, purchase suggestion component 102 may be implemented by a cloud of computing platforms and/or servers operating together as purchase suggestion component 102.

Electronic storage 144 may comprise non-transitory storage media that electronically stores information. The electronic storage media of electronic storage 144 may include one or both of system storage that is provided integrally (i.e., substantially non-removable) with purchase suggestion component 102 and/or removable storage that is removably connectable to purchase suggestion component 102 via, for example, a port (e.g., a USB port, a firewire port, etc.) or a drive (e.g., a disk drive, etc.). Electronic storage 144 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 144 may include one or more virtual storage resources (e.g., cloud storage, a virtual private network, and/or other virtual storage resources). Electronic storage 144 may store software algorithms, information determined by processor(s) 146, information received from purchase suggestion component 102, and/or other information that enables purchase suggestion component 102 to function as described herein.

Processor(s) 146 may be configured to provide information processing capabilities in purchase suggestion component 102. As such, processor(s) 146 may include one or more of a digital processor, an analog processor, a digital circuit designed to process information, an analog circuit designed to process information, a state machine, and/or other mechanisms for electronically processing information. Although processor(s) 146 is shown in FIG. 2 as a single entity, this is for illustrative purposes only. In some implementations, processor(s) 146 may include a plurality of processing units. These processing units may be physically located within the same device, or processor(s) 146 may represent processing functionality of a plurality of devices operating in coordination. Processor(s) 146 may be configured to execute components 126, 128, 130, 132, 134, and/or 136, and/or other components. Processor(s) 146 may be configured to execute components 126, 128, 130, 132, 134, and/or 136, and/or other components by software; hardware; firmware; some combination of software, hardware, and/or firmware; and/or other mechanisms for configuring processing capabilities on processor(s) 146. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 126, 128, 130, 132, 134, and/or 136 are illustrated in FIG. 2 as being implemented within a single processing unit, in implementations in which processor(s) 146 includes multiple processing units, one or more of components 126, 128, 130, 132, 134, and/or 136 may be implemented remotely from the other components. The description of the functionality provided by the different components 126, 128, 130, 132, 134, and/or 136 described below is for illustrative purposes, and is not intended to be limiting, as any of components 126, 128, 130, 132, 134, and/or 136 may provide more or less functionality than is described. For example, one or more of components 126, 128, 130, 132, 134, and/or 136 may be eliminated, and some or all of its functionality may be provided by other ones of components 126, 128, 130, 132, 134, and/or 136. As another example, processor(s) 146 may be configured to execute one or more additional components that may perform some or all of the functionality attributed below to one of components 126, 128, 130, 132, 134, and/or 136.

Figure 3A:
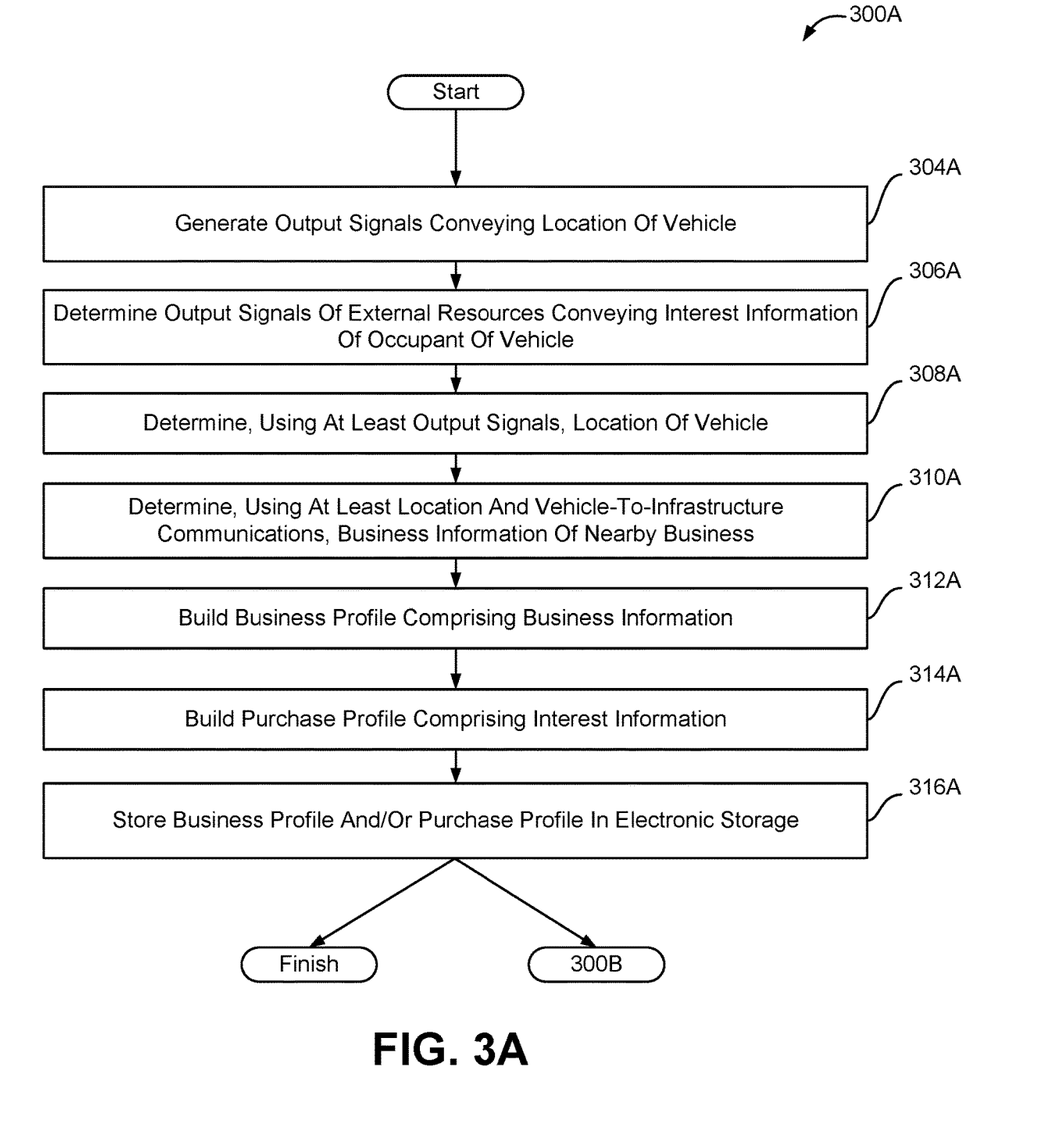
FIG. 3A illustrates a method to generate purchase suggestions, in accordance with one or more implementations.

FIG. 3A illustrates a method 300A to build and store one or more business profiles and/or one or more purchase profiles, in accordance with one or more implementations. The operations of method 300A presented below are intended to be illustrative. In some implementations, method 300A may be accomplished with one or more additional operations not described, and/or without one or more of the operations discussed. Additionally, the order in which the operations of method 300A are illustrated in FIG. 3A and described below is not intended to be limiting.

In some implementations, method 300A may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300A in response to instructions stored electronically on an electronic storage medium. The one or more processing devices may include one or more devices configured through hardware, firmware, and/or software to be specifically designed for execution of one or more of the operations of method 300A.

Prior to implementing method 300A, a user interface for presenting purchase suggestions to a driver or passenger may be initialized. For example, executable instructions stored on an electronic control unit of the vehicle may be executed to initialize the interface. As noted above, the interface may be provided in part using an infotainment system or other suitable presentation system of the vehicle.

An operation 304A may include generating output signals conveying a location of the vehicle. Operation 304A may be performed by one or more hardware processors configured by machine-readable instructions including a component that is the same as or similar to GPS sensor(s) 118A, in accordance with one or more implementations.

An operation 306A may include determining output signals of external resources conveying interest information of the vehicle occupant. Operation 306A may be performed by one or more hardware processors configured by machine-readable instructions including a component that is the same as or similar to interest information determination component 126; and/or communication lines, links, and/or ports, in accordance with one or more implementations.

An operation 308A may include determining, based on the output signals, the location of the vehicle. Operation 308A may be performed by one or more hardware processors configured by machine-readable instructions including a component that is the same as or similar to location information determination component 128, in accordance with one or more implementations.

An operation 310A may include determining, based on the location and/or V2I communications, business information of a nearby business. Operation 310A may be performed by one or more hardware processors configured by machine-readable instructions including a component that is the same as or similar to business information determination component 130, in accordance with one or more implementations.

An operation 312A may include building a business profile. The business profile may include the business information. Operation 312A may be performed by one or more hardware processors configured by machine-readable instructions including a component that is the same as or similar to profile management component 132, in accordance with one or more implementations.

An operation 314A may include building a purchase profile. The purchase profile may include the interest information. Operation 314A may be performed by one or more hardware processors configured by machine-readable instructions including a component that is the same as or similar to profile management component 132, in accordance with one or more implementations.

An operation 316A may include storing the business profile and/or the purchase profile in electronic storage. Operation 316A may be performed by one or more hardware processors configured by machine-readable instructions including a component that is the same as or similar to business profile management component 132, in accordance with one or more implementations.

Figure 3B:
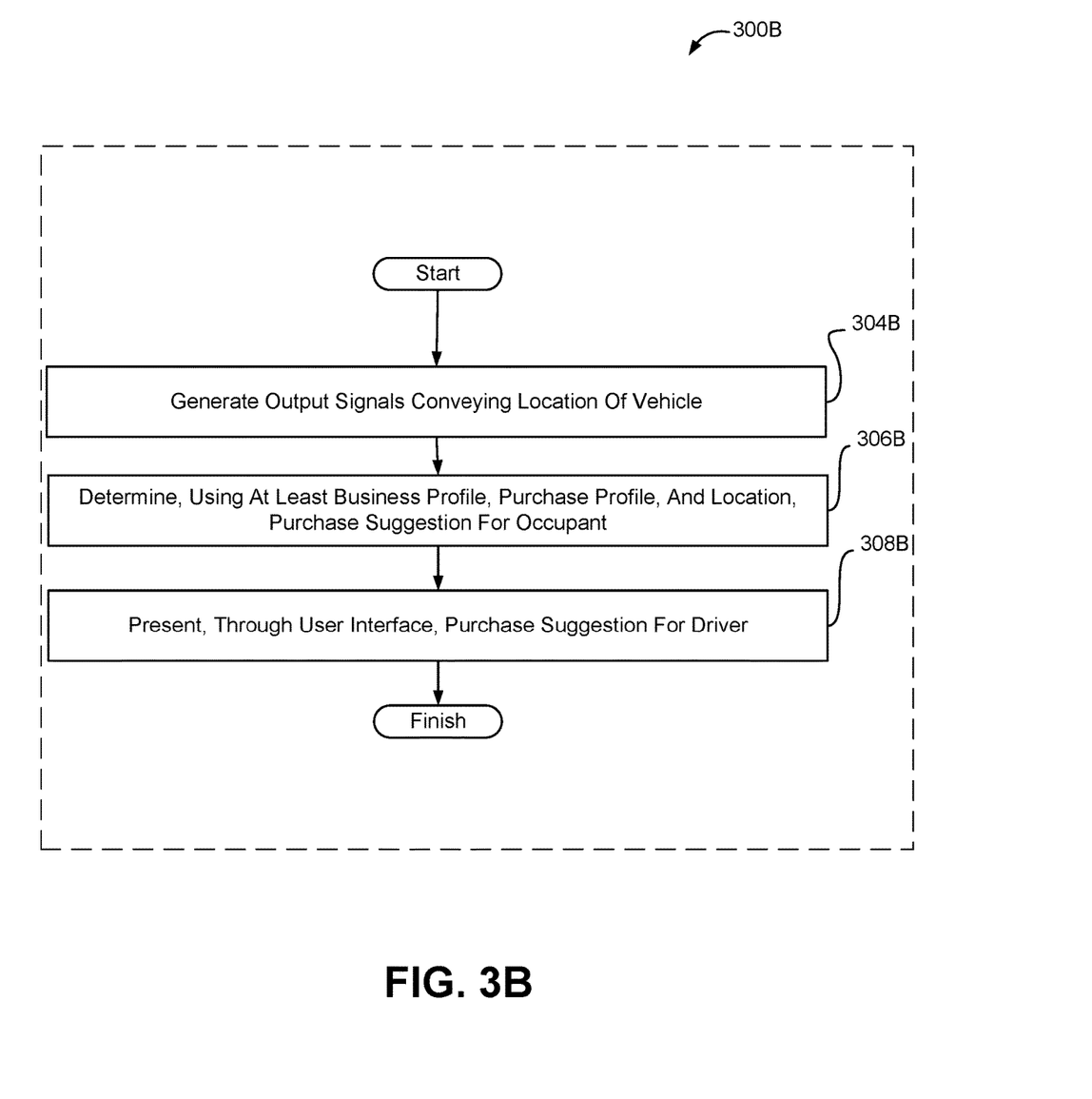
FIG. 3B illustrates an example implementation, in accordance with one or more implementations.

FIG. 3B illustrates a method 300B to generate purchase suggestions to the vehicle occupant. Method 300B may follow method 300A of FIG. 3A, in accordance with one or more implementations. The operations of method 300B presented below are intended to be illustrative. In some implementations, method 300B may be accomplished with one or more additional operations not described, and/or without one or more of the operations discussed. Additionally, the order in which the operations of method 300B are illustrated in FIG. 3B and described below is not intended to be limiting.

Prior to implementing method 300B, a user interface for presenting purchase suggestions to a driver or passenger may be initialized. For example, executable instructions stored on an electronic control unit of the vehicle may be executed to initialize the interface. As noted above, the interface may be provided in part using an infotainment system or other suitable presentation system of the vehicle.

An operation 304B may include generating output signals conveying a location of the vehicle. Operation 304B may be performed by one or more hardware processors configured by machine-readable instructions including a component that is the same as or similar to GPS sensor(s) 118A, in accordance with one or more implementations.

An operation 306B may include determining, based on the business profile, the vehicle occupant's purchase profile, and/or the location, a purchase suggestion for the vehicle occupant. Operation 306B may be performed by one or more hardware processors configured by machine-readable instructions including a component that is the same as or similar to purchase suggestion determination component 134, in accordance with one or more implementations.

An operation 308B may include presenting, through the user interface, the purchase suggestion for the vehicle occupant. Operation 308B may be performed by one or more hardware processors configured by machine-readable instructions including a component that is the same as or similar to purchase suggestion determination component 134 and user interface 120, in accordance with one or more implementations.

Figure 4:
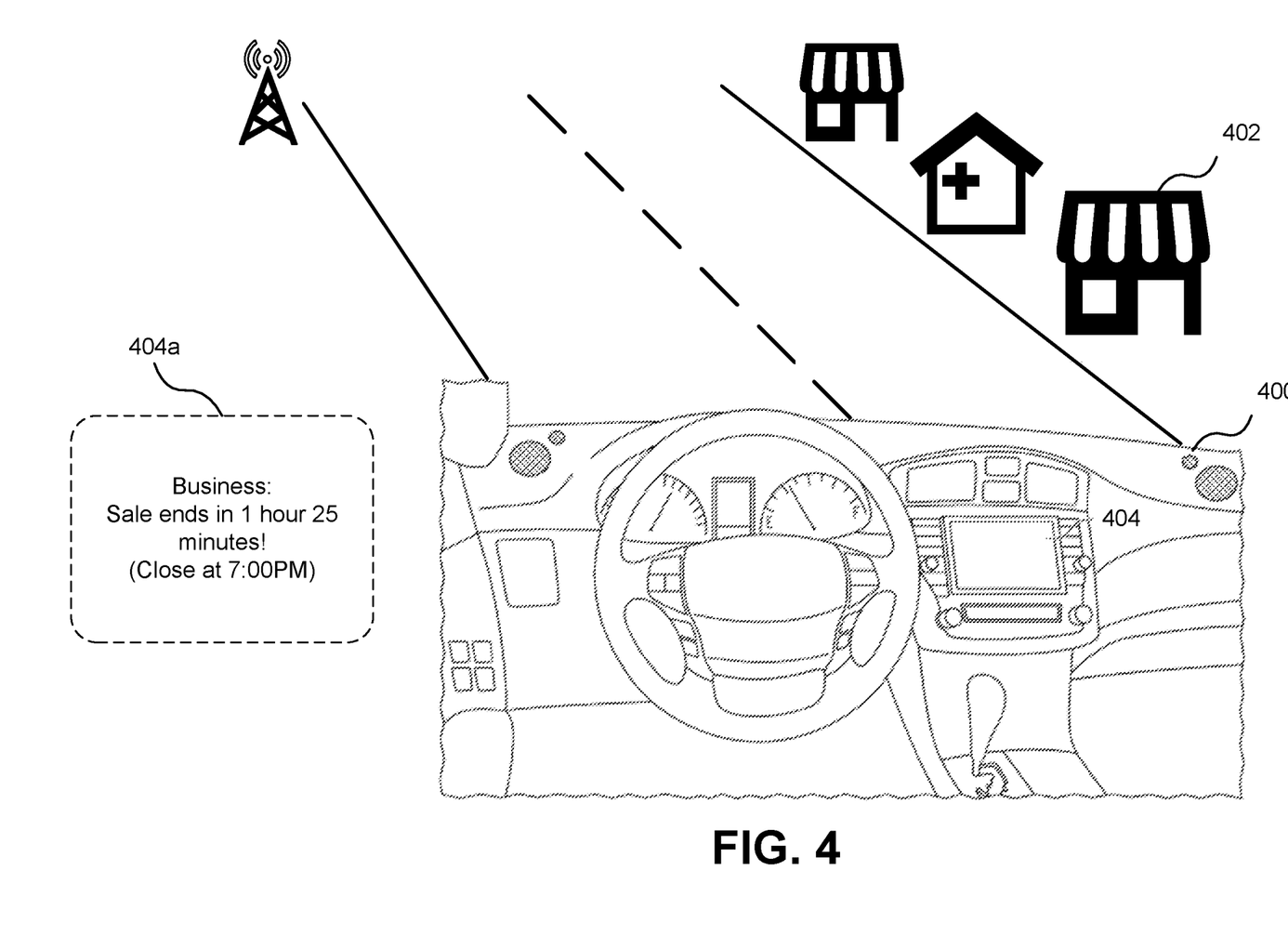
FIG. 4 illustrates an example implementation, in accordance with one or more implementations.

FIG. 4 illustrates an example embodiment, in accordance with one or more implementations, wherein a driver in vehicle 400 is driving near businesses. One business is business 402, a clothing store current holding a sale. Based on the determined frequent past purchases the driver makes at business 402 and the vehicle's proximate location to the business, it is determined that the driver may be interested in the ongoing sale. A reminder is presented on user interface 404, wherein user interface 404 may display message 404a.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system of a vehicle configured to generate purchase suggestions, comprising:
   a user interface configured to present purchase suggestions to an occupant of the vehicle;
   a GPS sensor configured to generate output signals conveying a current location of the vehicle;
   electronic storage configured to store one or more business profiles and purchase profiles;
   an imaging sensor capturing an image reflecting storefront information comprising business name, business hours, promotions, and acceptable payment forms; and
   a processor configured by machine-readable instructions to:
      determine, using at least received output signals of external resources, interest information of the occupant, the interest information identifying a type of product, a type of service, a product, or a service the occupant may be interested in purchasing;
      determine, using at least the output signals, the current location of the vehicle;
      synchronize the current location of the vehicle with vehicle-to-infrastructure (V2I) communications, and the captured image;
      determine, using at least the current location of the vehicle, the V2I communications, and the captured image, business information of a nearby business;
      build a business profile comprising the business information;
      build a purchase profile comprising the interest information;
      determine, using at least the business profile, the purchase profile, and the location, a purchase suggestion for the occupant; and
      present, through the user interface, the purchase suggestion to the occupant.

2. The system of claim 1, wherein the imaging sensor transmits the output signals conveying image information to a cloud server, wherein the cloud server is configured to determine the storefront information related to the business.

3. The system of claim 2, wherein the processor is further configured to determine the storefront information.

4. The system of claim 2, wherein the processor is further configured to present, through the user interface, the storefront information of the business to the occupant.

5. The system of claim 2, wherein the processor is further configured to add and/or update the storefront information of the business's profile.

6. The system of claim 1, wherein the location information includes GPS coordinates of the vehicle.

7. The system of claim 1, wherein the business information includes at least one of: inventory data, advertisements, active promotions, and current prices of items.

8. The system of claim 1, wherein the interest information includes the occupant's purchase preferences, purchase history, or desired purchases.

9. The system of claim 1, wherein the purchase suggestion includes advertisements, reminders to purchase, or current inventory of an item in a nearby business.

10. A method to generate purchase suggestions, the method comprising:
    generating output signals conveying a current location of a vehicle;
    receiving output signals of external resources conveying interest information of an occupant of the vehicle, the interest information identifying a type of product, a type of service, a product, or a service the occupant may be interested in purchasing along with a captured image reflecting storefront information comprising business name, business hours, promotions, and acceptable payment forms;
    determining, using at least the generated output signals, the current location of the vehicle;
    synchronizing the current location of the vehicle with vehicle-to-infrastructure (V2I) communications, and the captured image
    determining, using at least the determined current location of the vehicle, the V2I communications, and the captured image, business information of a nearby business;

building a business profile comprising the business information;

building a purchase profile comprising the interest information;

storing the business profile and the purchase profile in electronic storage;

determining, using at least the stored business profile, the stored purchase profile, and the determined location, a purchase suggestion for the occupant; and presenting, through a user interface, the purchase suggestion to the occupant.

11. The method of claim 10, wherein the captured image is transmitted to a cloud server, wherein the cloud server determines the storefront information.

12. The method of claim 11, further comprising determining the storefront information.

13. The method of claim 11, further comprising presenting, through the user interface, the storefront information of the business to the occupant.

14. The method of claim 11, further comprising adding and/or updating the storefront information of the business's profile.

15. The method of claim 10, wherein the location includes GPS coordinates of the vehicle.

16. The method of claim 10, wherein the business information includes inventory data, advertisements, active promotions, and current prices of items.

17. The method of claim 10, wherein the interest information includes the occupant's purchase preferences, purchase history, or desired purchases.

18. The method of claim 10, wherein the purchase suggestion includes advertisements, reminders to purchase, or current inventory of an item in a nearby business.

* * * * *